ANALOG-DIGITAL MULTIPLYING CIRCUIT
Filed May 10, 1968
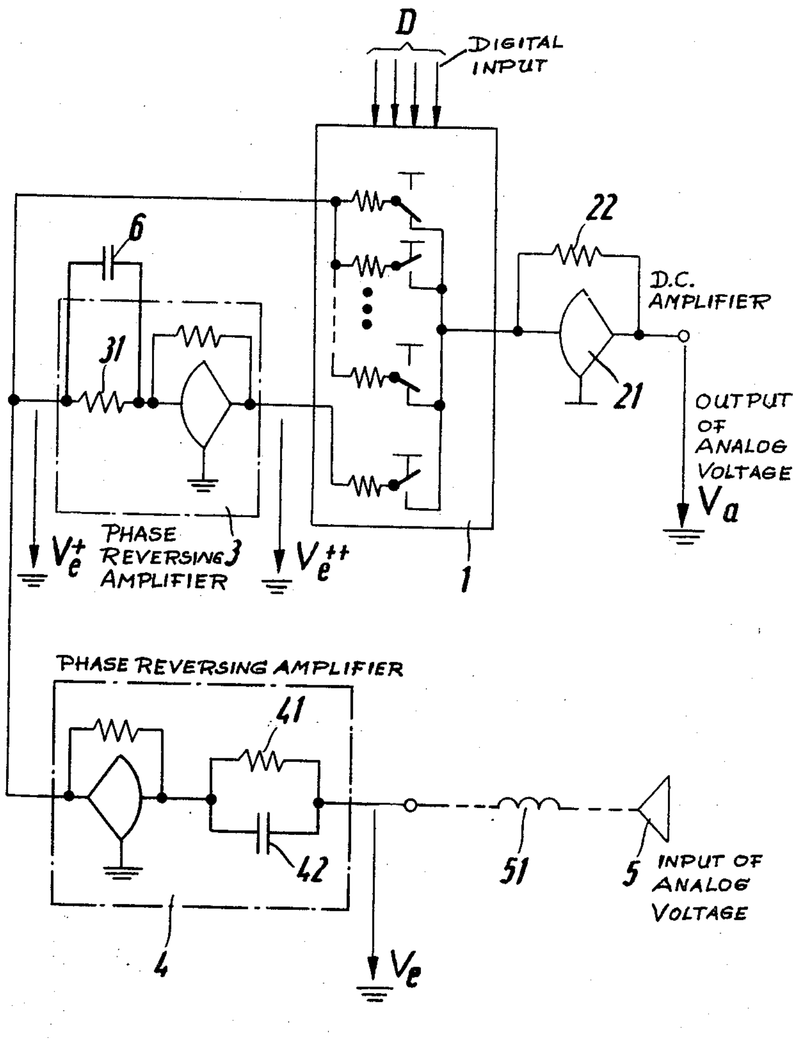
INVENTORS:
Gert Hartmann
Günter Haussmann
Karl Nosch
BY Spencer & Kaye
Attorneys United States Patent Office 3,522,420
Patented Aug. 4, 1970

3,522,420
ANALOG-DIGITAL MULTIPLYING CIRCUIT

Gert Hartmann, Litzelstetten, and Günter Haussmann and Karl Nosch, Konstanz, Germany, assignors to Telefunken Patentverwertungsgesellschaft m.b.H., Ulm, Danube, Germany

Filed May 10, 1968, Ser. No. 728,194
Int. Cl. G06j *1/00*
U.S. Cl. 235—150.52 6 Claims

ABSTRACT OF THE DISCLOSURE

A circuit for multiplying an analog voltage with a digital value. The analog voltage input is connected to a phase-reversing amplifier to decouple the current of the analog voltage input from the analog voltage source. The input circuit of the phase-reversing amplifier is a capacitance-resistance network in order to avoid or reduce to a minimum the phase angle between the output voltage and the input analog voltage.

BACKGROUND OF THE INVENTION

The present invention relates generally to the computer circuitry art and, more particularly, to an electric circuit device for multiplying a first value which is in the form of a voltage with a second value which is in digital form.

Such circuits include a resistance decoding network which has the first value applied to its input, which is fed directly to it, as well as the output from a phase-reversing amplifier. Depending upon the digital value, the resistors of the resistance network are connected to the input of a D.C. amplifier having high amplification and negative feedback and which delivers the product voltage.

These circuits are required in hybrid arithmetic or computing systems. In such systems there is often the necessity to multiply a digital value with an analog value and to obtain the result in the form of an analog voltage. The digital value must have a range between $-1$ and $+1$. In order for this to be comparable to the polarity of the analog output voltage, the analog input voltage must be fed into the resistance network with both polarities. Both input voltages are simultaneously used by the resistance network, particularly when negative digital values are present. In analog computer circuits, in order to maintain a predetermined maximum calculating error for each arithmetic element or device, it is necessary that the phase angle between the input voltage and the output voltage not exceed a predetermined value. It is known, for example, from "Nachrichtentechnische Fachberichte" (Communication Art Reports), volume 17, 1960, pages 3 ff. to reduce the phase error of an analog summing amplifier to the desired extent by the parallel connection of a suitable capacitance. The parallel connection of the capacitance substantially cancels out the natural phase lag of the amplifier output voltage with respect to the amplifier input voltage.

However, the above-mentioned phase lag which occurs in summing amplifiers can not be eliminated to the desired degree in modern operational amplifiers. However, here, too, the necessity still exists to perform the above-mentioned compensation. But this is not possible when the amplifier has a plurality of input resistors such as when employing a resistance digital-to-analog decoding circuit. In this case, the resistors are connected to the amplifier input depending upon a variable digital value and the number of resistors connected to the amplifier input continuously changes. Therefore, no constant complex resistance can be utilized to correct the amplifier phase-frequency characteristic. This is the case in the above-mentioned circuit arrangement for multiplication.

SUMMARY OF THE INVENTION

With this in mind, it is a main object of the present invention to provide a device which corrects the above-mentioned disadvantages of the prior art.

Another object of the present invention is to provide an arrangement for compensating for the frequency-dependent phase-frequency characteristic of the type of circuit arrangement mentioned above in as simple a manner as possible.

A further object of the invention is to provide an arrangement in which the input current is separated from the input voltage, which latter is used in the multiplication process.

These objects and others ancillary thereto are accomplished in accordance with preferred embodiments of the invention which provide a circuit for multiplying an analog voltage with a digital value. The analog voltage input is connected to a phase-reversing amplifier to decouple the current of the analog voltage input from the analog voltage source. The input circuit of the phase-reversing amplifier is constructed in the form of a capacitance-resistance network in order to avoid there being a phase angle between the output voltage and the analog voltage.

BRIEF DESCRIPTION OF THE DRAWING

The sole figure of the drawing is a schematic circuit diagram of the present invention.

DETAILED DESCRIPTION OF THE PREFERRED EMBODIMENT

In the present invention the circuit input of the resistance network is separated, with reference to the current, from the source of the input voltage which is used in the multiplication process. This separation is necessary because in hybrid coupling networks the analog values and digital values are often fed via long delay lines. Sudden variations of the input current of the resistance network—which are caused, for example, by the disconnection or interconnection of resistances within the resistance network during the change in the digital values—result in transient oscillations in the line containing the analog input voltage. These transient oscillations will make the multiplication result unusable for the duration of such oscillations.

With more particular reference to the drawing, the portion shown in thinner lines is that structure upon which the present invention is based, and those portions shown in bolder lines comprise the novel features added by the present invention.

The circuit includes a resistance digital-to-analog decoding network 1. A voltage $V_e{}^+$ is fed to this resistance network. Furthermore, through a phase-reversing amplifier 3 a voltage of opposite polarity $V_e{}^{++}$ is also fed to the resistance network. The output of this resistance network is connected to the input of a D.C. amplifier 21 having high amplification and negative feedback due to the resistor 22. The resistance digital-to-analog decording network includes a plurality of resistors which are connected between the voltages $V_e{}^+$ and $V_e{}^{++}$ on the one hand and the input of the D.C. amplifier on the other hand. The resistors can be connected into or out of the circuit depending upon the digital value D. The output voltage $V_a$ of the D.C. amplifier is therefore a measure of the product of the digital value D and the input voltage $V_e{}^+$. The digital-to-analog decoding network 1 is well known in the art and has been described, e.g., in the book of Richards, "Digital Computer Components and Circuits," D. Van Nostrand Company, Inc., page 496 and FIG. 11–10*b* on page 495.

Depending upon the phase-frequency characteristic of the D.C. amplifier 21, the output voltage $V_a$ follows the voltage $V_e^+$ at an angle which increases with increasing frequency. For example, this angle at a digital value of $D=-1$ and $V_e^+$ equals $\pm 10$ v. and at a frequency of $f=1$ kHz. is equal to 1.5°, at 5 kHz. it is 4.3°, at 10 kHz. it is 9.2°, and at 50 kHz. it is 36.8°. These angular values are too high for calculating purposes. In order to reduce them in accordance with the present invention the analog input voltage $V_e$ is fed to the above-described arrangement through a phase-reversing amplifier which has a phase-frequency characteristic which is inverse to that of amplifier 21. Since the phase angles of the phase-reversing amplifier 4 and of the D.C. amplifier 21 are added and since both are opposite and equal, the output voltage $V_a$ and the input voltage $V_e$ are in phase with each other.

In order to achieve the desired phase-frequency behavior of the phase-reversing amplifier 4, which is also a D.C. amplifier, its input resistance includes the parallel connection of the resistor 41 and the capacitor 42. Using such a complex input resistance the phase-reversing amplifier 4 has a phase-frequency characteristic which results from the phase-frequency characteristic of the RC member 41, 42 of $\alpha(\omega)=\arctan(R_{41}, C_{42})$, where $\alpha$=phase angle, $\omega$=circuit frequency, $R_{41}$ is the resistance of resistor 41, and $C_{42}$ is the capacitance of capacitor 42, and the phase-frequency characteristic of the amplifier 4.

By an appropriate selection of the capacitance-resistance network as the input resistance of the phase-reversing amplifier 4 it is possible to at least approximately provide every phase-frequency characteristic therefor.

In the text, Electronic Analog Computers, by Korn and Korn, McGraw-Hill Book Company, 1956, the transfer functions of a plurality of RC networks are listed in tables for use in the input circuits of operational amplifiers so that they can be selected without the need for extensive calculations. However, in general a capacitance resistance network of one capacitor and one resistor will already provide a sufficient improvement of the phase-frequency characteristic.

In addition to the phase compensation which is provided, the phase-reversing amplifier 4 also acts as a current-decoupling circuit between the input circuit of the resistance decoding network 1 and the source 5 of the input voltage $V_e$. The input resistance of the resistance decoding network varies depending upon the applied digital value D and this occurs suddenly and in no particular sequence. The current input into the resistance network 1 varies to the same extent. The output circuit of the phase-reversing amplifier 4 is of low resistance as is the case for all analog operational amplifiers so that there is no reflection from its output circuit to its input circuit. This is particularly significant when the source 5 providing the input voltage is connected to the circuit arrangement via a long trunk line 51. If this line were connected directly to the input of the phase-reversing amplifier 3 and to the direct input of the resistance network 1, transient oscillations would occur in the line during each variation of the digital value. This is due to the then occurring sudden current input variation of the resistance network and these transient oscillations would render the evaluation of the output voltage $V_a$ impossible for the duration of such transient oscillation.

The phase-reversing amplifier 3 has a frequency-dependent phase error as does the D.C. amplifier 21. Its output voltage follows its negative input voltage $-V_e^+$ at an angle $\phi$:

$$V_e^{++}=-V_e^+\cdot e^{-j\phi}$$

This phase inequality of the analog input voltages of the resistance network causes a further error in the multiplication. This is the greatest when the digital value D equals zero and the analog input voltage is not equal to zero (dynamic zero point error). In order to eliminate this error, a capacitor 6 is connected in parallel to the input resistor 31 of the phase-reversing amplifier 3. This capacitor 6 has such a value that the phase deviation of the amplifier 3 from the phase angle of 180° does not exceed a predetermined maximum value up to a predetermined limit frequency. If the phase-frequency characteristic of the uncompensated phase-reversing amplifier 3 is such that the parallel connection of a capacitor is not sufficient for phase error compensation, then the same construction can be used here as described in connection with the phase-reversing amplifier 4.

With the values of capacitors 6 and 42 and the resistors 31 and 41, respectively, being $C_{42}=85$ pf., $C_6=55$ pf., $R_{31}=R_{41}=20$ kΩ, the angular values which were mentioned above in dependence upon the frequency could be improved as follows: at 1 kHz. a phase angle of 0° resulted between the output voltage $V_a$ and the input voltage $V_e$, at 5 kHz. it was 0.1°, at 10 kHz. it was 0.26°, and at 50 kHz. it was 4.6°.

Thus, the above-mentioned example of the present invention extended the frequency range characterized by the same phase error, for example at 4.3°, by approximately 10 times.

It will be understood that the above description of the present invention is susceptible to various modifications, changes, and adaptations.

We claim:

1. In a circuit device for multiplying a first analog voltage value with a second digital value which includes a phase-reversing amplifier to which the first value is fed, a D.C. amplifier having high amplification and negative feedback for delivering the product voltage, and a resistance decoding network connected to receive the first value as well as the output of the phase-reversing amplifier, the improvement comprising D.C. amplifier means having high amplification and negative feed-back and connected between a source of the first value and directly to the resistance network and phase-reversing amplifier for decoupling the resistance network from the source furnishing the input voltage with respect to current and for reducing the phase error between the product voltage and the input voltage; and capacitance-resistance network means connected between the source and said D.C. amplifier means for compensating for the phase error so that the phase angle between the product voltage and the input voltage does not exceed a predetermined maximum value up to a predetermined frequency.

2. A circuit device as defined in claim 1 wherein said capacitance-resistance network means includes a parallel connection of a resistor and a capacitor.

3. A circuit device as defined in claim 1 wherein said phase-reversing amplifier has an input resistance circuit in the form of a capacitance-resistance network.

4. A circuit device as defined in claim 3 wherein the capacitance-resistance network of the phase-reversing amplifier includes the parallel connection of a resistor and a capacitor.

5. In a circuit device for multiplying an analog value, represented by an input voltage, with a digital value, which device includes switchable resistance network means having an output, two analog inputs, and a digital input connected for receiving such digital value, first amplifier means having an input terminal connected to the output of said resistance network means and an output terminal at which appears an analog product voltage, a junction point, and second amplifier means, one of said analog inputs of said resistance network means being connected directly to said junction point and the other said analog input being connected to said junction point via said second amplifier means, the improvement comprising third amplifier means the output of which is connected to said common feeding point and the input of which is connected to receive said input voltage, and capacitance resistance network means connected in series with said third amplifier means for shifting the phase of said input voltage in a direction opposite to the phase shift inherently produced by said first amplifier means so that the phase angle between said analog output voltage and said input voltage does not exceed a predetermined maximum value over a frequency range limited by a predetermined upper frequency.

6. A circuit device as defined in claim 5 wherein said first and third amplifier means are of D.C. amplifiers, and said second amplifier means is a phase-reversing amplifier.

References Cited

UNITED STATES PATENTS

| | | | |
|---|---|---|---|
| 3,018,046 | 1/1962 | Vance | 235—150.52 X |
| 3,027,082 | 3/1962 | Chao | 235—150.52 |
| 3,168,645 | 2/1965 | Vakowatz | 235—150.52 X |
| 3,171,022 | 2/1965 | Schmid | 235—150.52 |
| 3,177,350 | 4/1965 | Abbott et al. | 235—150.52 X |
| 3,294,961 | 12/1966 | Hose | 235—194 X |

MALCOLM A. MORRISON, Primary Examiner

J. F. RUGGIERO, Assistant Examiner

U.S. Cl. X.R.

235—150.5